(No Model.)
S. H. COFFEE.
CAR FENDER.
No. 552,349. Patented Dec. 31, 1895.
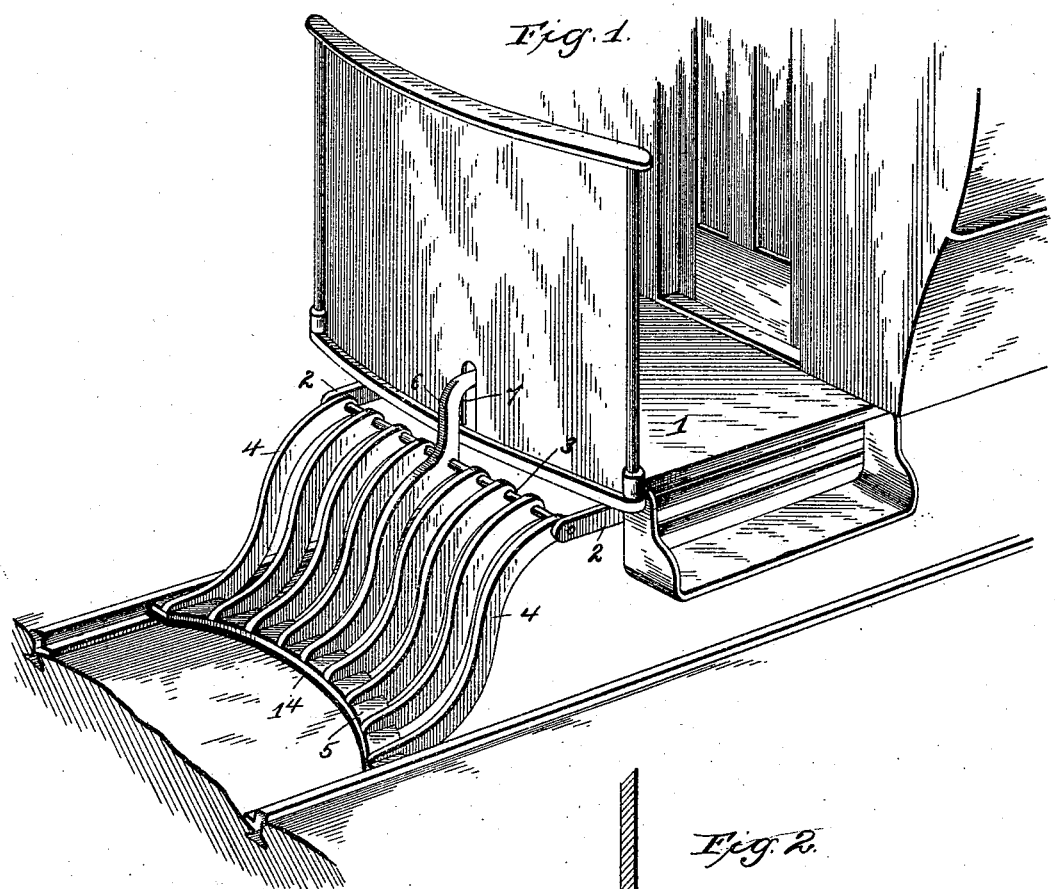
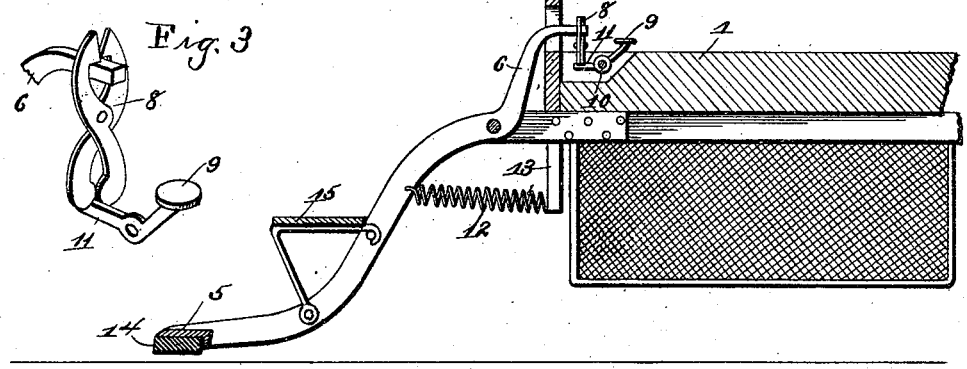
Witnesses
E. C. Wurdeman
J. T. Williamson
Inventor
Samuel H. Coffee
By his Attorney
Geo. H. Holgate

UNITED STATES PATENT OFFICE.

SAMUEL H. COFFEE, OF BEVERLY, NEW JERSEY.

CAR-FENDER.

SPECIFICATION forming part of Letters Patent No. 552,349, dated December 31, 1895.

Application filed May 17, 1895. Serial No. 549,609. (No model.)

*To all whom it may concern:*

Be it known that I, SAMUEL H. COFFEE, a citizen of the United States, residing at Beverly, in the county of Burlington and State of New Jersey, have invented certain new and useful Improvements in Car-Fenders, of which the following is a full, clear, and exact specification.

My invention relates to a new and useful improvement in car-fenders, and has for its object to provide such a device that shall be so carried in front of a car as to be readily dropped in contact with the track, whereby the momentum of said car will be greatly decreased or overcome, and a movable obstacle upon said track picked up, should it be struck before the motion of the car has been arrested.

With these ends in view, the invention consists in certain details of construction and combination of elements hereinafter set forth and then specifically designated by the claim.

In order that those skilled in the art to which this invention appertains may understand how to make and use the same, I will describe its construction and operation in detail, referring by number to the accompanying drawings, forming a part of this specification, and in which—

Figure 1 is a perspective of one end of a car having my improved fender attached thereto and represented as lowered and in contact with the rails. Fig. 2 is a vertical section showing the relative position of the several parts when the fender is in its normal elevated position, and Fig. 3 is a detail perspective of the hook mechanism.

Similar numbers denote like parts in all the views of the drawings.

1 represents the platform of the car, to which are secured brackets 2, extending outward, and pivoted to these brackets is the rod 3.

4 are a number of curved bars, secured at their upper ends to the rod 3, and extending downward and outward and fastened together by the foot-board 5, so as to form a fender of such shape as to scoop up an object with which it may come in contact.

6 is an extension of the center-bar 4, which projects through the slot 7 in the dash board, within the field of the sister hooks 8, pivoted to the floor of the platform and adapted to engage the rear end of said extension, so as to hold the fender in its normal elevated position, as shown in Figs. 2 and 3.

9 is a foot-lever, pivoted at 10 to the floor of the platform and terminating in the wedge 11, which projects between the two lower arms of the sister hooks, so that said hooks are caused to release their hold upon the extension 6 by pressing upon the foot-lever, which forces said wedge between said arms, causing the noses of said hooks to separate.

12 is a coiled spring, secured to one of the bars of the fender and to a projection 13, from the platform of the car, so as to increase the force with which the fender will drop upon the track when released by the hooks.

From this description the operation of my improvement will be obviously as follows: Should a motorman in control of a car passing rapidly along the track see an obstruction, such as a person, in danger of being struck by the car, he has only to depress the foot-lever 9, which will disengage the hooks 8, to release the extension 6, whereby the fender is held in an elevated position, when said fender will by its gravity and the action of the spring 12 be brought in immediate contact with the rails of the track, and as the foot-board is provided with the rubber shoe 14, of such length and shape as to fit between the crown of said rails and bear firmly upon the tread thereof, it follows that the momentum of the car will be immediately reduced without the loss of time required to apply the brake, and should the distance between an obstruction and the car be sufficient, the frictional contact between said rubber shoe and the rails will eventually bring the car to a complete stop; but, on the other hand, should the car not come to a complete stop before coming in contact with the obstruction, the fender will act as a scoop to pick up such obstruction and carry it safely until the car is finally brought to a standstill.

Should it be found desirable, a seat 15 may be secured upon the fender, as shown in Fig. 2, so that in picking up a person said person may safely ride upon said fender without inconvenience.

It is obvious that a number of changes might be made in the exact form and construction of my improvement without departing from the spirit of my invention.

Having thus fully described my invention, what I claim as new and useful is—

The herein described combination of the brackets 2, rod 3, supported by said brackets, bars 4, secured to said rod, foot board 5, uniting the lower ends of said bars, shoe 14, secured to said foot board and adapted to fit the rails of the track, extension 6, hooks 8, for engaging said extension, foot lever 9, adapted to disengage said hooks from said extension and the spring 12, adapted to increase frictional contact between said shoe and rails, all arranged as shown and for the purpose specified.

In testimony whereof I have hereunto affixed my signature in the presence of two subscribing witnesses.

SAMUEL H. COFFEE.

Witnesses:
S. S. WILLIAMSON,
ALLISON W. MCCURDY.